United States Patent
Blair et al.

[11] Patent Number: 6,109,506
[45] Date of Patent: Aug. 29, 2000

[54] METHOD OF ENHANCING A JOINED METAL ASSEMBLY

[75] Inventors: Howard Douglas Blair; John Michael Nicholson, both of Romulus; Tsung-Yu Pan, Ypsilanti, all of Mich.

[73] Assignee: Ford Global Technologies, Inc., Dearborn, Mich.

[21] Appl. No.: 09/220,024

[22] Filed: Dec. 23, 1998

[51] Int. Cl.⁷ .................................................. B23K 31/02
[52] U.S. Cl. ........................... 228/175; 228/245; 228/248
[58] Field of Search ..................... 228/175, 120, 228/164, 165, 177, 178, 234.1, 245, 246, 248.1, 258

[56] References Cited

U.S. PATENT DOCUMENTS

| | | | |
|---|---|---|---|
| 3,655,017 | 4/1972 | Lorcher et al. | 188/321 |
| 4,083,113 | 4/1978 | Miller et al. | 32/14 |
| 4,248,905 | 2/1981 | Harvey . | |
| 4,272,006 | 6/1981 | Kao | 228/183 |
| 4,358,884 | 11/1982 | Harvey et al. . | |
| 4,408,900 | 10/1983 | Takasugi et al. | 368/295 |
| 4,758,407 | 7/1988 | Ballentine et al. | 420/560 |
| 4,775,337 | 10/1988 | Van Wagener et al. | 439/883 |
| 5,018,259 | 5/1991 | Wildman | 29/160.6 |
| 5,036,913 | 8/1991 | Murphy et al. | 165/173 |
| 5,102,748 | 4/1992 | Wylam et al. . | |
| 5,407,004 | 4/1995 | DeRisi et al. | 165/153 |
| 5,423,112 | 6/1995 | Murphy et al. | 29/890.043 |
| 5,527,628 | 6/1996 | Anderson et al. . | |

*Primary Examiner*—Patrick Ryan
*Assistant Examiner*—Kiley Stoner
*Attorney, Agent, or Firm*—Damian Porcari

[57] ABSTRACT

A method of enhancing a joint in a metal assembly. At least two metal members are joined together. Each member has a joining surface that mates with the other joining surface. The metal members are contacted against one another such that the joining surfaces mate. The mated joining surfaces are welded together at multiple locations. The welding process leaves a small gap between the metal members between these welding locations. Heat is applied to the joining surfaces adjacent to the gap. A solder is applied to the heated joining surfaces. The joining surfaces cause the solder to melt and to be wicked into the gap by the capillary force. The solder fills the length, width and thickness of the gap and joins the metal members together with a metallurgical bond. The entire joint including areas between the welding locations becomes joined.

28 Claims, 1 Drawing Sheet

METHOD OF ENHANCING A JOINED METAL ASSEMBLY

BACKGROUND OF THE INVENTION

1. Field of the Invention

The present invention is directed to a method of enhancing the joint between two metal members. More specifically, the invention is directed to strengthening metal members welded at multiple locations along the joint by filling the gaps between the metal members and reacting the metal members metallurgically with a solder.

2. Description of the Related Art

Most automobile bodies are manufactured by welding a series of stamped metal members. This construction is known as 'unibody'. The dynamics of the vehicle are related to the structural integrity of the metal joints. It is desirable to manufacture a vehicle having a high stiffness to provide better ride and handling characteristics. One component of this stiffness is the flexing between the metal members at seams and joints. Various methods have been pursued to increase the stiffness of these joints and seams. The metal may be made thicker to reduce the flexing or bending. However thicker metal increases the weight of the vehicle and the cost of the material. It is also possible to increase the number of welds on a particular component to reduce its flexing. However, the increased number of welds significantly complicates and slows the manufacturing processes for producing the vehicle.

It has been proposed to place an adhesive between these metal joints to provide a bond along the entire length of the joint. The adhesive is placed between mating surfaces of the members. The members are brought together and squeeze the adhesive therebetween. Use of structural adhesive has several disadvantages. The adhesive must be applied before the welding operation thus requiring an additional step. The adhesive creates a nonmetallic layer between the two metal members. Welding requires intimate contact between the metal members and thus metal particulates must be added to the adhesives to assure metal to metal contact. This makes it more difficult to weld the members. The welding operation itself creates temperatures in excess of 2,000° F. This vaporizes any nearby adhesive. The adhesive requires post-curing at an elevated temperature for 0.05 to 5 hours which slows the assembly process. The adhesive is also messy and complicated to apply between the metal components. These adhesive joints are difficult to repair. Finally, the adhesive is likely to be more expensive and adding weight to the vehicle. It is desirable to find an alternative to structural adhesive that provides the same degree of stiffening but at a reduced cost and without unduly complicating the welding process.

It has long been known that joint seams or dents in metal members may be filled with a low melting metal composition. Historically, lead-based solder alloys have been used as a body filler for joints and dents. However, due to the environmental hazards of lead particles and the resulting possible legislation of reducing or banning Pb usage, lead-based solder fillers are no longer used in the body assembly.

More recently, a lead-free body filler has been disclosed as described in U.S. Pat. Nos. 4,248,905, 4,358,884, and 4,374,904. These patents teach a lead-free solder composition for application on a steel surface. The solder has a relatively low melting point (about 210° C.) and is spread as a thixotropic paste. The solder is used to fill joint seams and dents in a vehicle body. The solder is made from between 10 and 25 weight percent copper, zero to 7.5 weight percent zinc, zero to 1.5 weight percent iron, and the balance tin. Because this solder is intended for use as a dent or seam filler, the patents caution against preparing a composition that has an excessive liquid base. The excessive liquid base makes the solder too fluid to handle when being applied as a thixotropic paste to the surface of the metal. The solder is made to have a thick and pasty constituency. It may be easily shaped with a paddle on the body and smoothed into the desired surface configuration. However, the compositions that are useful as a body filler, are not useful for filling the small gaps between the metal members. Low viscosity solders are required to wet the metal surface or wick between gaps typically less than 0.001 in.

It is an object of the present invention to enable the use of welded metal members to produce a stiff automotive vehicle body structure. It is also an object of the present invention to enable the use of existing welding equipment and procedures to weld the metal members without the use of adhesives. Finally, it is desirable to produce a metal assembly that has a bond along the entire joint without increasing the number of welds or using adhesives.

SUMMARY OF THE INVENTION

The present invention teaches the method of enhancing a metal assembly. The metal assembly is preferably an automotive vehicle body but may be other components or structures. At least two metal members are joined together. Each member has a joining surface that mates with the other joining surface. The metal members are contacted against one another such that the joining surfaces mate. The mated joining surfaces are welded together at multiple locations routinely referred to as spot welds. The welding process creates a metal-to-metal bond at each welding location. The space between the spot welds along the metal members are not metallurgical bonded although they maybe in close contact. That is to say, a gap exists between the mating metal members. Sometimes in a curved joint, a larger gap may be created between the spot welds due to the mismatch of the mating members and the constraint caused by the spot welds. The gap creates a space of between 0 and 0.005 inches between the metal members. The joining surfaces include an edge along at least one metal member and an inner portion. The space between the edge and the inner portions is the width of the gap. The space between the joining surfaces is the thickness of the gap. The distance between the welding locations is the length of the gap.

Heat is applied to the joining surfaces adjacent to the gap. A low-corrosive or non-corrosive flux may be applied along the gap before heat is applied A solder is applied to the heated joining surfaces. The flux may be also incorporated into the solder in the form of flux-coiled or paste. The joining surfaces cause the solder to melt and to be wicked into the gap by the capillary force. The solder fills the length, width and thickness of the gap and joins the metal members together with a metallurgical bond. The entire joint including areas between the welding locations becomes joined. The resulting joint is substantially stiffer than a joint that is only welded and comparable to or better than the adhesive-filled welded joint.

The invention may be used with either steel or aluminum members. When using steel members without coating or coated with zinc or zinc-alloys, the preferred composition includes between 0 and 3.5 weight percent copper, between 1 and 30 weight percent zinc, between 0 and 0.5 weight percent iron, between 0 and 1 weight percent bismuth, between 0 and 0.5 weight percent antimony, between 0 and 1 weight percent silver, between 0 and 0.5 weight percent cobalt, and the balance tin. When used with aluminum or aluminum alloy members, the preferred composition contains between 0 and 3.5 weight percent copper, between 5.0 and 40.0 weight percent zinc, between 0 and 1.0 weight percent nickel, between 0 and 3 weight percent aluminum, between 0 and 1.0 weight percent bismuth, between 0 and 0.5 weight percent antimony, between 0 and 1.0 weight percent silver, between 0 and 0.5 weight percent cobalt, and the balance tin.

The invention is particularly well suited for the manufacture of an automotive vehicle body. The solder forms a continuous bond along the joint. The joint produces an assembly that is significantly stiffer than one without a solder bond. The solder enables the manufacture of an assembly at much lower cost than one filled with adhesive. The solder solidifies in seconds after wicking into the gaps, compared to 0.05 to 5 hours of post-curing for adhesives, so it fits well into the flow of assembly. Finally, the solder enables the use of existing welding equipment and processes because the joining surfaces between the weld locations do not receive adhesive.

These and other desired objects of the present invention will become more apparent in the course of the following detailed description and appended claims. The invention may best be understood with reference to the accompanying drawings wherein illustrative embodiments are shown.

DETAILED DESCRIPTION OF THE PREFERRED EMBODIMENTS

Figure 1:
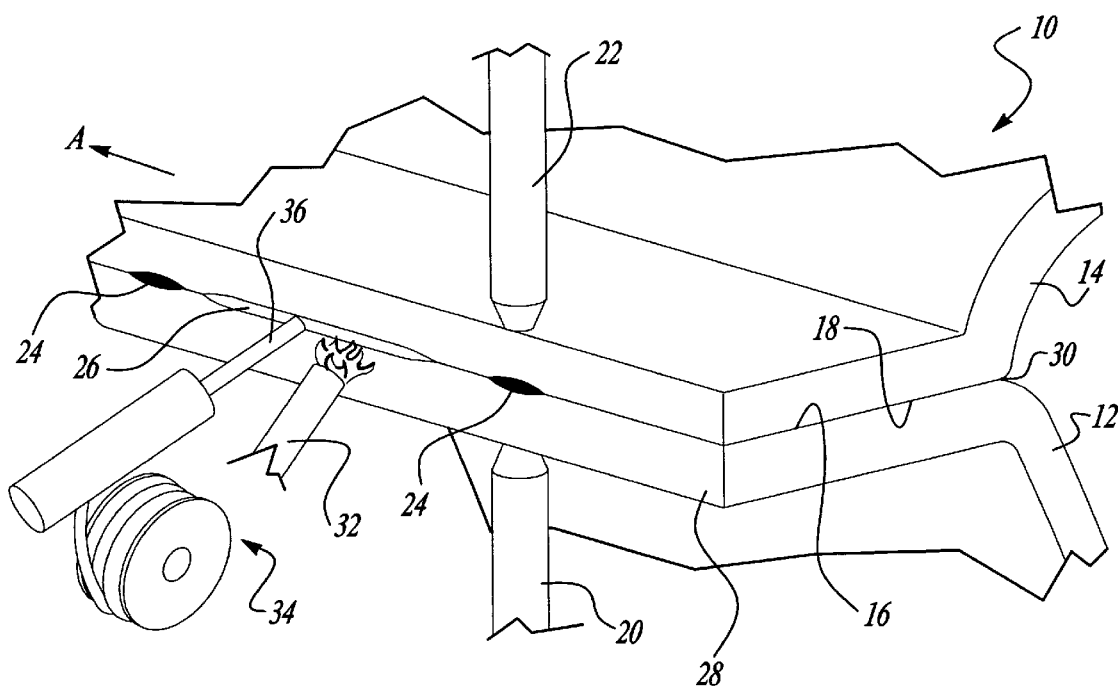
FIG. 1 is a perspective view of the joining operation.
Figure 2:
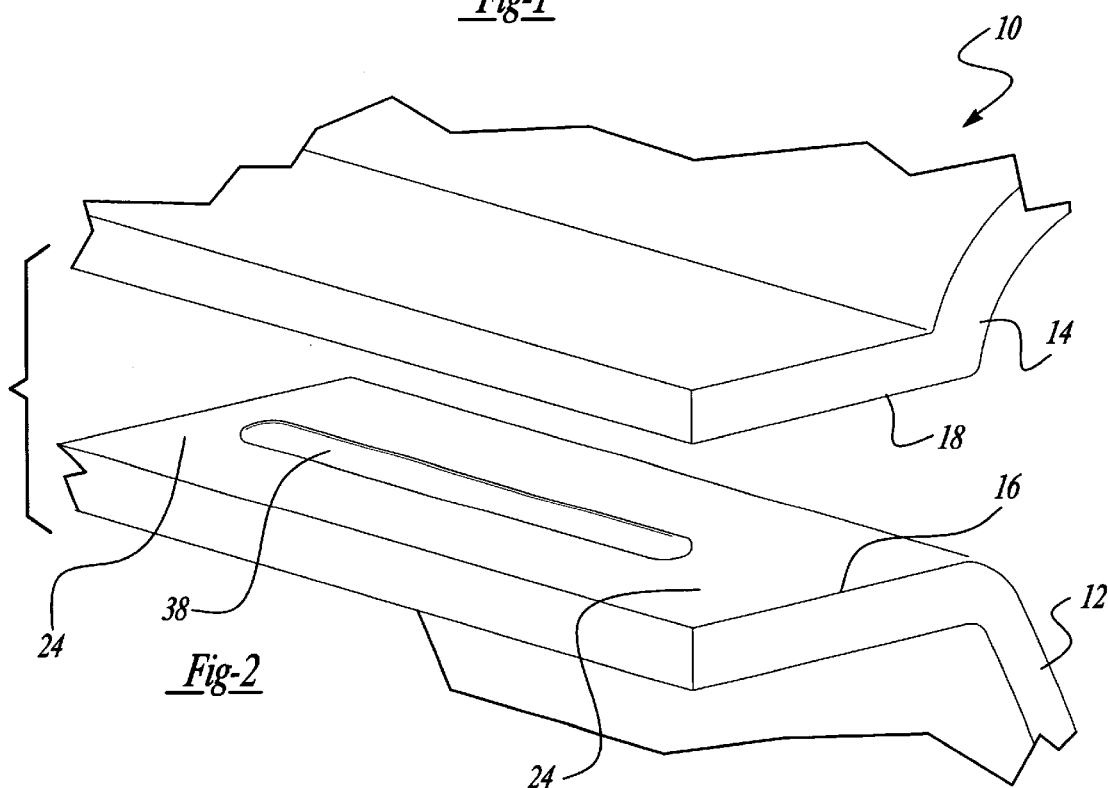
FIG. 2 is a perspective view of an alternative embodiment of the invention utilizing a solder placed between the members before joining.

The invention as illustrated FIGS. 1 and 2 teaches a method of manufacturing and automotive body assembly. The present invention will be described with a pair of drawings, which illustrate the soldering operation claimed. While the invention describes the manufacturing of an automotive vehicle body, other components may be manufactured using the same or similar process, techniques and equipment, and are included within the scope of the invention described.

The following items are a word list of the items described in the drawings and are reproduced to aid the understanding the invention;

10 body assembly
12, 14 metal members
16, 18 joining surfaces
20, 22 welding electrodes
24 welding location
26 gap
28 edge
30 inner portion
32 heat applicator
36 solder
38 solder Illustrated in FIG. 1 is a perspective view of a vehicle automotive body assembly 10. The body assembly 10 comprises two metal members 12, 14. The metal members 12, 14 are shaped to have joining surfaces 16, 18. The joining surfaces generally include some type of flange that forms a joint such as a hem flange, butt joint or lap joint.

The joining surfaces 16, 18 are brought together in a jig or fixture (not shown). The fixture causes the joining surfaces to meet and create a metal-to-metal contact between the joining surfaces. The welding electrodes 20, 22 form a weld between the joining surfaces 16, 18. The weld location 24 forms a metal to metal uniform bond between the members 12, 14. A small gap 26 is created between the weld locations 24. The gap 26 extends between the weld locations 24. The joining surfaces 16, 18 include at least one edge 28 and an inner portion 30. The distance between the edge 28 and the inner portion 30 is the width of the gap 26. The distance between the joining surfaces 16, 18 is the thickness of the gap. The distance between the weld locations 24 is the length of the gap. The gap 26 is generally thicker at the midway portion between the welding locations 24. A typical gap will have a length of 2 to 6 inches, a width of 0.1 to 1 inches and a thickness of 0 to 0.005 inches.

The body assembly 10 is moved in the direction of arrow A. Immediately following the welding electrodes 20, 22, is a heat applicator 32. The applicator 32 may be any type of heat generating source including flame, air, induction, resistive, laser or radiant heating. A flux may be applied before the heat applicator 32. The heat applicator 32 heats one or both joining surfaces 16, 18 to a temperature above that needed to melt the solder composition described below. After the joining surfaces 16, 18 are heated, a solder dispensing device 34 dispenses a quantity of solder 36 into the gap 26. The solder 36 melts when contacting the preheated metal surfaces and is wicked into the gap 26 by the capillary force. The solder 36 enters the gap 26 through the edge 28 and is drawn to the inner portion 30. The melted solder wets the joining surfaces 16, 18 and forms a solder bond thereto. While the solder may be applied by manual methods, the most preferred method of application is by robot immediately subsequent to the welding operation while the members 12, 14 are still in a jig or fixture.

The solder may be a solid bar or rod, a paste or liquid. The solder may optionally include a flux that cleans the metal surfaces during the soldering operation. The flux is preferred to be non-corrosive, low-corrosive, or washable.

EXAMPLE 1.

The method described herein may be used to solder a variety of metal compositions including steel, zinc coated steel, zinc-alloy coated steel, aluminum, and aluminum alloys. When soldering to steel and zinc or zinc-alloy coated steel, the following solder composition was found to be useful:

TABLE 1

| Component | Percentage |
| --- | --- |
| Copper: | between 0 and 5 weight percent, |
| Zinc: | between 1 and 40 weight percent, |
| Iron: | between 0 and 1.0 weight percent, |
| Antinomy: | between 0 and 1.0 weight percent, |
| Bismuth: | between 0 and 2.0 weight percent, |
| Silver: | between 0 and 3.5 weight percent, |
| Cobalt: | between 0 And 1.0 weight percent, |
| Tin: | balance. |
| Performance | |
| Solidus temperature: | from 190 to 232° C. |
| Liquidus temperature: | from 190 to 450° C. |

TABLE 1-continued

| | |
|---|---|
| Liquid viscosity: | between 0.010 and 0.030 poise. |
| Sample form: | rod, wire, paste, liquid. |
| Flux: | non-corrosive residues, low-corrosive residues, or water-soluble, |
| Application: | manual or robot. |
| Joint shear strength: | (without weld) from 20 to 60 MPa. |

The invention may also be used for bonding aluminum members. When bonding aluminum members, the following compositions were found to be useful:

TABLE 2

| Component | Percentage |
|---|---|
| Copper: | between 0 and 5.0 weight percent, |
| Zinc: | between 1 and 40.0 weight percent, |
| Nickel: | between 0 and 5.0 weight percent, |
| Aluminum: | between 0 and 5.0 weight percent, |
| Antinomy: | between 0 and 1.0 weight percent, |
| Bismuth: | between 0 and 2.0 weight percent, |
| Silver: | between 0 and 3.5 weight percent, |
| Cobalt: | between 0 and 1.0 weight percent, |
| Tin: | balance. |
| Performance | |
| Solidus temperature: | from 190 to 232° C. |
| Liquidus temperature: | from 190 to 450° C. |
| Liquid viscosity: | between 0.010 and 0.030 poise. |
| Sample form: | rod, wire, paste, liquid. |
| Flux: | non-corrosive residues, low-corrosive residues, or water-soluble, |
| Application: | manual or robot. |
| Joint shear strength: | (without weld) from 20 to 60 MPa. |

Illustrated in FIG. 2 is a perspective view of an alternative embodiment of the present invention. In this alternative embodiment, the solder 38 is applied between the joining surfaces of 16, 18 before they are brought together. The solder 38 may be applied as a paste, ribbon, cladding, or spray. The solder 38 is applied between the weld locations 24 so as not to inhibit the intimate metal-to-metal bond needed for welding. The members 12, 14 are brought together and welded as previously described. The assembly 10 is locally heated in the region adjacent to the solder 38 or alternatively, the body assembly 10 may be heated in an oven. Oven baking is convenient when coupled with another process such as electro-deposition coating cure. In this example, the solder 37 is placed between the joining surfaces 16, 18 and the members 12, 14 are joined in a welding operation. The body assembly 10 is submerged in an electro-deposition coating bath. After the electro-deposition coating process, the body assembly 10 is heated in a bake oven to a temperature exceeding the melting point of the solder 38. The solder 38 melts and wets the joining surfaces 16, 18 to form a solder bond therebetween. In this alternative embodiment, no separate or additional heating process is required to solder the members 12, 14.

The invention has been described as a method of manufacturing an automotive body assembly using the drawings and descriptions provided. While the best modes for carrying out the invention has been described as a method to form a vehicle body, those familiar with the art to which this invention relates will recognize the various alternatives in design and embodiments for practicing invention as defined by the following claims.

What is claimed:

1. A method of joining a metal assembly comprising the steps of:

providing two metal members, each member having a joining surface, said joining surfaces mating when brought together;

contacting said metal members such that said joining surfaces mate;

welding said metal members at multiple locations along said joining surfaces, said welding process creating a metal to metal bond at said welding locations leaving an unbonded gap between said joining surfaces and between said welding location;

heating said joining surfaces of said metal members adjacent said gap; and applying a solder to said heated joining surfaces, said solder melting and wicking into said gap, whereby said members are joined between said welding locations with a solder metallurgical bond.

2. The method of claim 1, wherein said joining surfaces include an edge and an inner portion, said solder wicking into said gap from said edge.

3. The method of claim 2, wherein said inner portion is spaced 0.1 to 1.0 inches from said edge.

4. The method of claim 3, wherein said solder fills said gap between said edge and said inner portion.

5. The method of claim 1, wherein said gap is between 0 and 5 mils.

6. The method of claim 1, wherein said metal members are steel and zinc- or zinc-alloy-coated steel.

7. The method of claim 6, wherein said solder contains between 0 and 5.0 wt % Cu, between 1 and 40 wt % Zn, between 0 and 1.0 wt % Fe, between 0 and 2.0 wt % Bi, between 0 and 1.0 wt % Sb, between 0 and 3.5 wt % Ag, between 0 and 1.0 wt % Co, and the balance Sn.

8. The method of claim 7, wherein said preferred solder contains between 0 and 3.5 wt % Cu, between 1 and 30 wt % Zn, between 0 and 0.5 wt % Fe, between 0 and 1 wt % Bi, between 0 and 0.5 wt % Sb, between 0 and 1 wt % Ag, between 0 and 0.5 wt % Co, and the balance Sn.

9. The method of claim 1, wherein said solder has a liquidous viscosity of between 0.010 and 0.030 poise.

10. The method of claim 1, wherein said metal members are aluminum or aluminum alloys.

11. The method of claim 10, wherein said solder containing between 0 and 5 wt % Cu, between 1 and 40.0 wt % Zn, between 0 and 5.0 wt % Ni, between 0 and 5.0 wt % Al, between 0 and 2.0 wt % Bi, between 0 and 1.0 wt % Sb, between 0 and 3.5 wt % Ag, between 0 and 1.0 wt % Co, and the balance Sn.

12. The method of claim 11, wherein said preferred solder contains between 0 and 3.5 wt % Cu, between 5.0 and 40.0 wt % Zn, between 0 and 1.0 wt % Ni, between 0 and 3 wt % Al, between 0 and 1.0 wt % Bi, between 0 and 0.5 wt % Sb, between 0 and 1.0 wt % Ag, between 0 and 0.5 wt % Co, and the balance Sn.

13. A method of forming an automotive body having increased stiffness comprising the steps of:

providing two metal members, each member having a planar joining surface, said joining surfaces mating when brought together, said joining surfaces having an edge and an inner portion;

contacting said metal members such that said joining surfaces mate;

welding said metal members at multiple locations along said joining surfaces, said welding process creating a metal to metal bond at said welding locations and creating a gap between said between said joining surfaces and between said welding location;

heating said joining surfaces of said metal members adjacent said gap; and applying a solder to said edge of said heated joining surfaces, said solder melting and wicking into said gap between said edge and said inner portion, whereby said members are joined between said welding locations with a solder metallurgical bond.

14. The method of claim 13, wherein said metal members are steel and zinc- or zinc-alloy- coated steel.

15. The method of claim 14, wherein said solder contains between 0 and 5.0 wt % Cu, between 1 and 40 wt % Zn, between 0 and 1.0 wt % Fe, between 0 and 2.0 wt % Bi, between 0 and 1.0 wt % Sb, between 0 and 3.5 wt % Ag, between 0 and 1.0 wt % Co, and the balance Sn.

16. The method of claim 15, wherein said preferred solder contains between 0 and 3.5 wt % Cu, between 1 and 30 wt % Zn, between 0 and 0.5 wt % Fe, between 0 and 1 wt % Bi, between 0 and 0.5 wt % Sb, between 0 and 1 wt % Ag, between 0 and 0.5 wt % Co, and the balance Sn.

17. The method of claim 16, wherein said solder has a liquidous viscosity of between 0.010 and 0.030 poise.

18. The method of claim 13, wherein said metal members are aluminum or aluminum alloys.

19. The method of claim 18, wherein said solder containing between 0 and 5 wt % Cu, between 1 and 40.0 wt % Zn, between 0 and 5.0 wt % Ni, between 0 and 5.0 wt % Al, between 0 and 2.0 wt % Bi, between 0 and 1.0 wt % Sb, between 0 and 3.5 wt % Ag, between 0 and 1.0 wt % Co, and the balance Sn.

20. The method of claim 19, wherein said preferred solder contains between 0 and 3.5 wt % Cu, between 5.0 and 40.0 wt % Zn, between 0 and 1.0 wt % Ni, between 0 and 3 wt % Al, between 0 and 1.0 wt % Bi, between 0 and 0.5 wt % Sb, between 0 and 1.0 wt % Ag, between 0 and 0.5 wt % Co, and the balance Sn.

21. A method of joining a metal assembly comprising the steps of:

providing two metal members, each member having a joining surface, said joining surfaces mating when brought together;

applying a solder between said joining surfaces contacting said metal members such that said joining surfaces mate;

welding said metal members at multiple locations along said joining surfaces, said welding process creating a metal to metal bond at said welding locations and creating a gap said between joining surfaces and between said welding location; and heating said joining surfaces and causing said solder to melt, said melting solder wicking into said gap, whereby said members are joined between said welding locations with a solder metallurgical bond.

22. The method of claim 21, wherein said metal members are steel and zinc- or zinc-alloy- coated steel.

23. The method of claim 21, wherein said solder contains between 0 and 5.0 wt % Cu, between 1 and 40 wt % Zn, between 0 and 1.0 wt % Fe, between 0 and 2.0 wt % Bi, between 0 and 1.0 wt % Sb, between 0 and 3.5 wt % Ag, between 0 and 1.0 wt % Co, and the balance Sn.

24. The method of claim 22, wherein said preferred solder contains between 0 and 3.5 wt % Cu, between 1 and 30 wt % Zn, between 0 and 0.5 wt % Fe, between 0 and 1 wt % Bi, between 0 and 0.5 wt % Sb, between 0 and 1 wt % Ag, between 0 and 0.5 wt % Co, and the balance Sn.

25. The method of claim 23, wherein said solder has a liquidous viscosity of between 0.010 and 0.030 poise.

26. The method of claim 21, wherein said metal members are aluminum or aluminum alloys, with or without coatings.

27. The method of claim 26, wherein said solder contains between 0 and 5 wt % Cu, between 1 and 40.0 wt % Zn, between 0 and 5.0 wt % Ni, between 0 and 5.0 wt % Al, between 0 and 2.0 wt % Bi, between 0 and 1.0 wt % Sb, between 0 and 3.5 wt % Ag, between 0 and 1.0 wt % Co, and the balance Sn.

28. The method of claim 26, wherein said solder contains between 0 and 3.5 wt % Cu, between 5.0 and 40.0 wt % Zn, between 0 and 1.0 wt % Ni, between 0 and 3 wt % Al, between 0 and 1.0 wt % Bi, between 0 and 0.5 wt % Sb, between 0 and 1.0 wt % Ag, between 0 and 0.5 wt % Co, and the balance Sn.

* * * * *